Patented Jan. 21, 1947

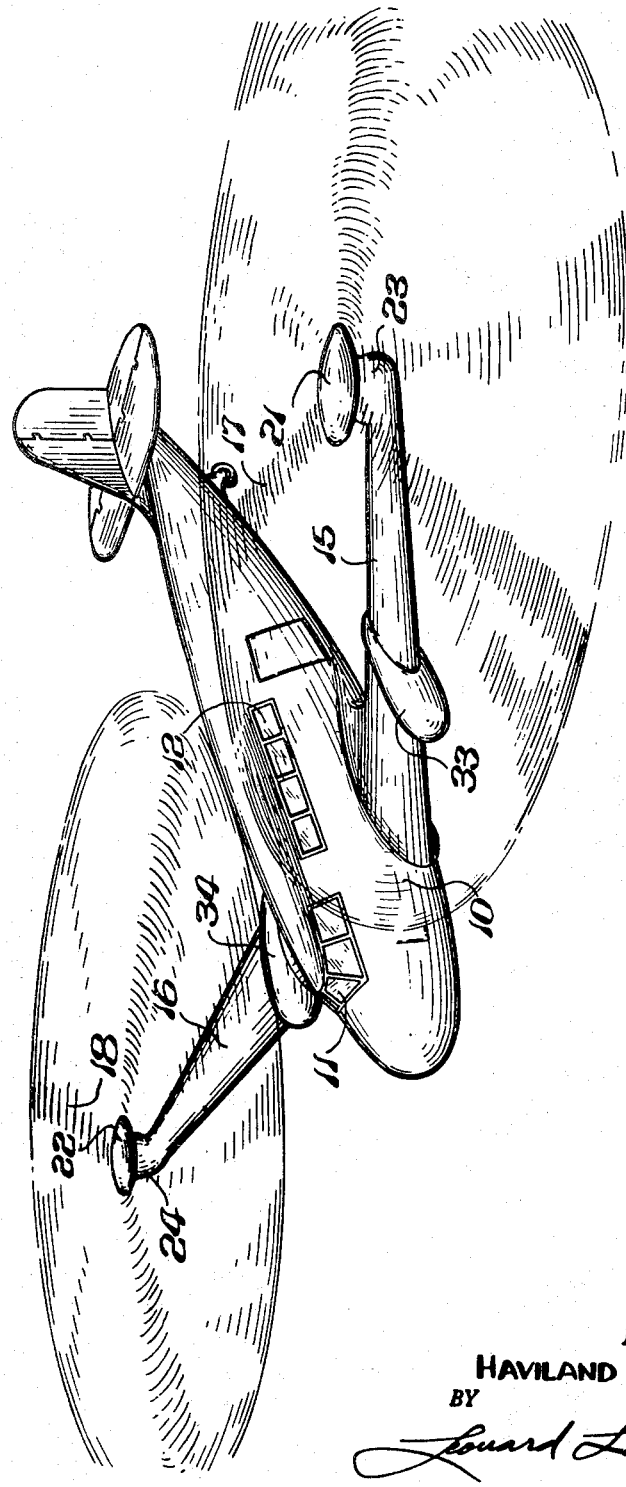

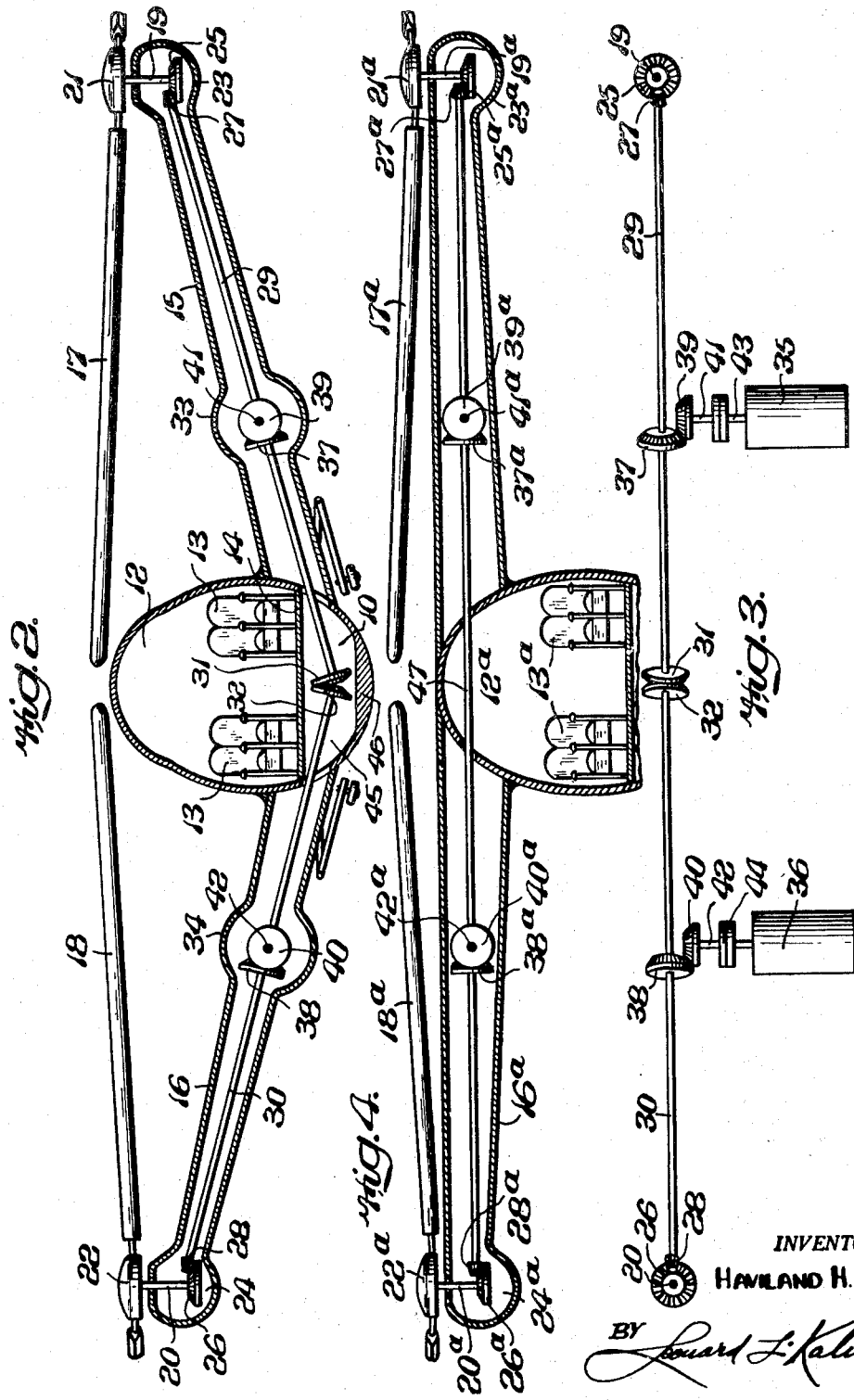

2,414,766

UNITED STATES PATENT OFFICE 2,414,766

ROTARY WING DRIVE

Haviland H. Platt, New York, N. Y., assignor to Rotary Research Corporation, Eddystone, Pa., a corporation of Pennsylvania Application December 3, 1943, Serial No. 512,703

4 Claims. (Cl. 244—17)

The present invention relates to heavier-than-air aircraft and more particularly to rotative-winged aircraft, and still more particularly to helicopters having twin rotors disposed transversely to the axis of forward flight.

An object of the present invention is to provide a twin rotor aircraft having two or more power plants, any one of the power plants being adapted to drive both of the rotors upon failure of the other. Another object of the present invention is to provide a helicopter having a pair of laterally-disposed torsionally-interconnected rotors and having two or more power plants carried by the rotor supports. Still another object of the present invention is to provide a twin-rotor transport aircraft adapted to utilize a maximum portion of the fuselage for passenger accommodation or the like. A further object of the present invention is to provide an aircraft having a plurality of laterally-disposed torsionally-interconnected rotors all adapted to be driven by any one of a plurality of power plants, and having a maximum of fuselage space available for useful load.

Other objects and advantages of the present invention are apparent in the following detailed description, appended claims and accompanying drawings.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a perspective view of one embodiment of the present invention.

Figure 2 represents a more or less schematic vertical cross-sectional view of the embodiment of Figure 1 showing the rotor driving mechanism.

Figure 3 represents a schematic plan view of the driving mechanism of Figure 2.

Figure 4 represents a cross-sectional view, generally similar to that of Figure 2, but showing another embodiment of the present invention.

In the embodiment of Figures 1, 2 and 3, I may provide a helicopter having a generally conventional fuselage 10 adapted for accommodation of passengers. The fuselage 10 (which may be provided with conventional rear-end rudder and elevator surfaces) may include a forward operating cabin 11 and a main passenger cabin 12. The passenger cabin 12 may include a plurality of seats 13 mounted upon the floor 14 of said cabin and may also be provided with sleeping accommodations (not shown).

A pair of upwardly-inclined pylons 15 and 16 extend outwardly from the lower portion of the fuselage 10 and support, at their ends, a pair of oppositely-rotatable lifting rotors 17 and 18 respectively. The rotors 17 and 18 are thus carried at a level higher than the top of the fuselage 10 whereby they can be positioned as closely as possible to each other to reduce the over-all lateral dimension of the aircraft to a minimum.

Shafts 19 and 20 extend downwardly from the hubs 21 and 22 of the rotors 17 and 18 respectively and extend into housings 23 and 24 provided at the ends of the pylons 15 and 16 respectively.

Bevel gears 25 and 26 are provided at the lower ends of the shafts 19 and 20 respectively and are adapted to be oppositely-rotated by pinions 27 and 28 carried at the outboard ends of drive-shafts 29 and 30 extending within the pylons 15 and 16 respectively.

The inboard ends of the drive-shafts 29 and 30 extend inside of the fuselage 10 into a compartment 45 beneath the floor 14; the drive-shafts 29 and 30 carrying bevel pinions 31 and 32 respectively. The compartment 45 is provided with a strong lower wall 46 which protects the bevel pinions 31 and 32 from injury which might otherwise result from a "belly" landing or other mishap which would tend to stove in the underside of the fuselage 10. The pinions 31 and 32 are disposed in operative juxtaposition whereby the drive-shafts are torsionally interconnected. In this way, the drive-shafts 29 and 30 and their associated rotors 17 and 18 rotate at the same rate at all times.

In place of the bevel pinions 31 and 32 it is possible to use one or more universal joints or other similar means for providing torsional interconnection between the inboard ends of the drive-shafts 29 and 30.

Nacelles 33 and 34 are provided generally intermediate the ends of the pylons 15 and 16 and carry the power plants 35 and 36. The drive-shafts 29 and 30 are adapted to be rotated by the power plants 35 and 36 respectively through bevel gears 37 and 38 provided on the drive-shafts 29 and 30, and pinions 39 and 40 carried at the ends of power shafts 41 and 42; the pinions 39 and 40 being geared to the bevel gears 37 and 38 respectively.

Over-running clutches 43 and 44 connect the power shafts 41 and 42 to their respective power plants 35 and 36. The clutches 43 and 44, which may be like that disclosed in my co-pending application Serial No. 435,001 filed March 17, 1942 or any other equivalent construction, are adapted to disconnect their respective power plants 35 and 36 from the power shafts 41 and 42 and the drive-shafts 29 and 30 whenever the speed of rotation of the power plants drops below the speed of rotation of the torsionally-interconnected shaft system.

It is apparent that, during normal operation, the rotors 17 and 18 will be rotated at the same speed but in opposite directions (in order that the torque effect of the rotors be neutralized) by both power plants 35 and 36.

Should either of the power plants 35 and 36 fail, however, its over-running clutch will disconnect it from the shaft system and both rotors 17 and 18 will continue to be rotated by the remaining power plant, free of any drag which would otherwise be imposed by the dead power plant.

Should both power plants fail, they would both be disconnected from the rotors by the over-running clutches 43 and 44, whereupon the rotors 17 and 18 would be free to rotate by auto-gyration so that the aircraft could descend slowly and could land safely without danger of "crashing."

The construction of the present invention thus provides greater safety and efficiency of operation over conventional twin-rotor aircraft in which each rotor is provided with its own independent power plant or in which a single power plant located in the fuselage operates both of the rotors. The present construction is superior to conventional twin-rotor multi-power plant constructions in that, in these conventional constructions failure of one power plant will put its rotor out of commission whereupon the aircraft would be supported in flight only by the single laterally-displaced rotor still operating. This would cause such an unbalanced lift that only by instantaneous shutting off of the other engine could the helicopter be kept from overturning. An emergency power-off landing would then have to be made at once.

In the present construction, on the other hand, both rotors would continue to be operated at equal speed upon failure of either power plant so that the aircraft could continue in normal flight to its original destination. If desired, the power plants of the present construction may be provided with manual or automatic gear boxes or transmissions (not shown) so that the remaining power plant could operate both rotors at somewhat reduced speed to prevent overloading of the power plant. If the rotors are of constant-speed variable-pitch type, means (not shown) could be provided to lessen the angle of pitch or of "bite" upon failure of one power plant in order to prevent overloading of the remaining power plant.

The present construction is greatly superior to twin rotor aircraft having a single power plant located in the fuselage since the space taken up by the power plant and the transmission in the fuselage of such conventional construction aircraft greatly reduces the space available for pay load. Furthermore, the safety feature of such single-engine aircraft is much less than that of the present construction since failure of the single engine would compel the aircraft to land within a very short distance by means of autogyration which might be impractical where the aircraft is operating over water or other mountainous or forest or other difficult terrain.

While, for purposes of illustration, I have shown an aircraft equipped with one power plant located in each pylon, it is obvious that two or more power plants could be located at spaced intervals along each pylon (each connected to the drive-shaft through a power shaft and an over-running clutch as described herein) to give greater power and/or safety factor if desired.

The present invention also contemplates the use of two or more rotors carried by each pylon and geared to the common drive-shaft (actuated by one or more plants disposed in each pylon as described herein) whereby greater lift may be obtained and whereby all of the rotors will be actuated, upon failure of one or more of the power plants, by the remaining operating power plant or plants.

As can be seen particularly in Figure 2, the bevel pinions 31 and 32, which are located at the apex or point of the vertical V are disposed at the bottom of the fuselage, and outside of the cabin space thereof, so that maximum utilization of the fuselage space for pay load is possible. The V-arrangement of the upwardly-inclined pylons 15 and 16 of the embodiment of the Figures 1 and 2 not only is desirable from a structural viewpoint, but also furnishes stabilizing effect due to the dihedral angle.

I have shown another embodiment of the present invention in Figure 4. In this embodiment (in which the several parts are given the same numbers as the corresponding parts of the embodiment of Figures 1 and 2 but followed by the suffix "—a"), the pylons 15—a and 16—a extend generally horizontally from the top of the fuselage 10—a. Instead of the inclined drive-shafts 29 and 30 and the bevel pinions 31 and 32 of the embodiment of Figure 2, this embodiment employs a single horizontal drive-shaft 47 which extends through the top of the fuselage 10—a; the drive-shaft 47 passing through the fuselage 10—a at a height sufficiently great as not to interfere with normal use of the cabin space.

The embodiment of Figure 4 has the advantage of greater simplicity and lesser weight in that it eliminates the bevel pinions 31 and 32 and substitutes a single drive-shaft in place of the inclined drive shafts 29 and 30.

On the other hand, the embodiment of Figures 1 and 2 is more desirable from a structural standpoint and from the standpoint of stabilizing dihedral resulting from the V-arrangement of the pylons.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what I claim as new and desire to protect by Letters Patent, is:

1. In a helicopter having a fuselage, a cabin extending fore-and-aft through a substantial portion of said fuselage, a compartment disposed within said fuselage below said cabin, a pair of upwardly-inclined pylons extending generally laterally and oppositely from the lower portion of said fuselage, a lift rotor carried by each of said pylons, said rotors furnishing substantially the entire support for the helicopter, power transmission means interconnecting said rotors and adapted to turn them in opposite directions, said power transmission means including a pair of inclined shafts extending through said pylons and into said compartment and a pair of operatively-engaged bevel pinions carried by the inboard ends of said shafts for operatively interconnecting said shafts within said compartment without restricting the cabin space, a power plant carried by each of said pylons and operatively connected to said power transmission means, and overrunning clutches disposed intermediate said power plants and said shafts for automatically disconnecting either of said power plants upon failure thereof, whereby the remaining power plant can drive both rotors without restraint from the power plant which has failed.

2. In a helicopter having a fuselage, a cabin extending fore-and-aft through a substantial portion of said fuselage, a pair of members extending generally laterally from opposite sides of said fuselage, a lift rotor carried by each of said members generally at the outer end thereof, said rotors furnishing substantially the entire support for the helicopter, power transmission means extending intermediate said rotors, said power transmission means including a pair of shafts extending through said members and into said fuselage adjacent a vertical extremity thereof and operatively-engaged bevel gears carried by the ends of said shafts, said gears being so disposed within said fuselage as not materially to restrict the cabin space, a power plant carried by each of said members generally intermediate the ends thereof, means for operatively connecting said power plants to said shafts for driving said rotors, and overrunning clutches disposed intermediate said power plants and said shafts for automatically disconnecting either of said power plants upon failure thereof, whereby the remaining power plant can drive both rotors without restraint from the power plant which has failed.

3. In a helicopter having a fuselage, a pair of members extending generally laterally from opposite sides of said fuselage, a lift-rotor supported by each of said members substantially at its outboard end, a power plant carried by each of said members intermediate said fuselage and each of said rotors, a drive shaft extending through each of said members and operatively interconnecting each of said power plants with the lift-rotor on its side, means operatively interengaging said drive shafts for equal rotation, articulation means associated with said interengaging means, and means for automatically disconnecting either of said power plants upon failure thereof, whereby both rotors can be rotated by the remaining power plant.

4. In a helicopter having a fuselage, a cabin extending fore-and-aft through a substantial portion of said fuselage, a pair of members extending generally laterally from opposite sides of said fuselage, a lift-rotor supported by each of said members substantially at its outboard end, a power plant carried by each of said members intermediate said fuselage and each of said rotors, a drive shaft extending through each of said members and operatively interconnecting each of said power plants with the lift-rotor on its side, means operatively interengaging said drive shafts for equal rotation, articulation means associated with said interengaging means, said interengaging means being so disposed within said fuselage as not materially to restrict the cabin space, and means for automatically disconnecting either of said power plants upon failure thereof, whereby both rotors can be rotated by the remaining power plant.

HAVILAND H. PLATT.